United States Patent
Zhang et al.

(10) Patent No.: US 10,007,567 B2
(45) Date of Patent: Jun. 26, 2018

(54) METHOD AND DEVICE FOR RECOVERING DATA REPLICATION BETWEEN STORAGE DEVICES

(71) Applicant: EMC IP HOLDING COMPANY LLC, Hopkinton, MA (US)

(72) Inventors: Alex Minghui Zhang, Shanghai (CN); Brian Tianfang Xiong, Shanghai (CN); Yuanyang Wu, Shanghai (CN); Yifeng Lu, Shanghai (CN); Sherry Hongru Xu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 15/389,775

(22) Filed: Dec. 23, 2016

(65) Prior Publication Data

US 2017/0192703 A1    Jul. 6, 2017

(30) Foreign Application Priority Data

Dec. 31, 2015    (CN) .......................... 2015 1 1021598

(51) Int. Cl.
*G06F 11/07* (2006.01)
*G06F 12/16* (2006.01)

(52) U.S. Cl.
CPC .............. *G06F 11/07* (2013.01); *G06F 12/16* (2013.01)

(58) Field of Classification Search
None
See application file for complete search history.

(56) References Cited

U.S. PATENT DOCUMENTS

| | | | | | |
|---|---|---|---|---|---|
| 5,432,922 | A | * | 7/1995 | Polyzois | G06F 11/1666 707/999.202 |
| 5,742,792 | A | * | 4/1998 | Yanai | G06F 3/0601 710/1 |
| 5,778,167 | A | * | 7/1998 | Carrel | G06F 11/2082 711/165 |
| 5,889,935 | A | * | 3/1999 | Ofek | G06F 11/2066 709/217 |
| 6,052,797 | A | * | 4/2000 | Ofek | G06F 11/2064 709/219 |
| 7,120,824 | B2 | * | 10/2006 | Burton | G06F 11/2058 714/6.23 |
| 7,133,988 | B2 | * | 11/2006 | Fujibayashi | G06F 3/0605 711/162 |
| 7,287,181 | B2 | * | 10/2007 | Thompson | B01L 3/50851 714/6.3 |
| 8,631,272 | B2 | * | 1/2014 | Prabhakaran | G06F 11/1662 710/114 |

(Continued)

*Primary Examiner* — Kevin Verbrugge
(74) *Attorney, Agent, or Firm* — Krishnendu Gupta; Konrad R. Lee

(57) ABSTRACT

There is provided a method and device for recovering data replication between storage devices. The method comprises: creating mirrored pairs between logical units of a primary storage device and logical units of a secondary storage device; in response to the primary storage device recovering from an interruption state to a normal state, re-creating the mirrored pairs based on one or more replication sessions between the logical units of the primary storage device and the logical units of the secondary storage device stored before interruption; and replicating data to the primary storage device based on the re-created mirrored pairs.

18 Claims, 5 Drawing Sheets

(56) References Cited

U.S. PATENT DOCUMENTS

| | | | |
|---|---|---|---|
| 8,930,748 B2 * | 1/2015 | Ikeuchi | G11B 27/36 714/6.22 |
| 9,405,628 B2 * | 8/2016 | Blea | G06F 17/30079 |
| 9,619,331 B2 * | 4/2017 | Blea | G06F 11/1446 |

* cited by examiner

METHOD AND DEVICE FOR RECOVERING DATA REPLICATION BETWEEN STORAGE DEVICES

RELATED APPLICATIONS

This application claim priority from Chinese Patent Application Number CN201511021598.3, filed on Dec. 31, 2015 at the State Intellectual Property Office, China, titled "METHOD AND DEVICE FOR RECOVERING DATA REPLICATION BETWEEN STORAGE DEVICES" the contents of which is herein incorporated by reference in its entirety.

FIELD

The present disclosure generally relates to the technical field of storage, and more specifically, relates to a method and device for recovering data replication between storage devices.

BACKGROUND

Data storage devices, for example a product of the EMC, VNX2, provide a disaster recovering system of the file level. If a disaster occurs on a primary storage device, the selected network attached storage (NAS) server, together with all its file systems, snapshots, and network configurations, can be switched to a secondary storage device through a continuous data service.

However, there might be a case that the primary storage device may be interrupted due to outage. After the primary storage device is recovered from an interruption state, the data on the secondary storage device cannot be automatically replicated to the primary storage device. As an example of the disaster recovery, VNX2 provides a disaster recovery service of the file level by using a MirrorView/S solution. In the solution, a mirrored pair is created for a pair of logical units (LUNs). The LUN of the primary storage device serves as a primary mirror in the mirrored pair, and the LUN of the secondary storage device serves as a secondary mirror in the mirrored pair. The mirrored pair is placed in a consistency group and managed collectively as a single entity.

When the primary storage device does not respond normally or is interrupted during switchover, the single consistency group is destroyed, resulting in two local consistency groups. Hence, when the primary storage device is recovered from the interruption state, the data on the secondary storage device cannot be automatically replicated to the primary storage device through the two local consistency groups. In other words, the data replication is interrupted.

In the case of the two local consistency groups, although the NAS client may continue to access the data on'the secondary storage system, the altered/updated data cannot be replicated to the primary storage system. This would cause the data to be unprotected. A user may try to re-create the mirrored pair and the consistency group, but it is difficult to find the corresponding primary mirror and secondary mirror.

SUMMARY

In order to solve the above problem, the present disclosure provides a method, and device for recovering data replication between storage devices. The method can acquire original mirror information from replication sessions reserved in a database (DB), for example re-create a mirrored pair and a consistency group by the replication session, and restart a file transmission from a secondary storage system to a primary storage system. Once data is synchronized, the data replication may be switched to the primary storage system.

A first aspect of the present disclosure provides a method of recovering data replication between storage devices, comprising; creating mirrored pairs between logical units of a primary storage device and logical units of a secondary storage device; in response to the primary storage device recovering from an interruption state to a normal state, re-creating the mirrored pairs based on one or more replication sessions between the logical units of the primary storage device and the logical units of the secondary storage device stored before interruption; and replicating data to the primary storage device based on the re-created mirrored pairs.

The method allows the user to recover the interrupted data replication in an automatic manner after the primary storage system is recovered from the interruption state. Once the recovering command is performed, the data may be automatically replicated from the secondary storage system to the primary storage system.

According to an embodiment of the present disclosure, creating mirrored pairs between logical units of a primary storage device and logical units of a secondary storage device comprises: creating the mirrored pairs corresponding to the respective logical units of the primary storage device and the respective logical units of the secondary storage device, each mirrored pair including a primary mirror corresponding to one of the logical units of the primary storage device and a secondary mirror corresponding to a respective one of the logical units of the secondary storage device; forming a consistency group based on the mirrored pairs; and storing first information including the mirrored pairs and the consistency group to a database of the primary storage device, and replicating the first information to a database of the secondary storage device.

For a write operation, the data is firstly written into the LUNs at the primary storage device side and simultaneously replicated (or synchronized) to the LUNs at the secondary storage device side, to ensure that the data stored in the LUNs at the primary storage device side and in the LUNs at the secondary storage device side are exactly identical after the write operation. In this way, upon a failure of the primary storage device, the secondary storage device can immediately provide a data service as a backup storage device. Thus, data synchronization is achieved and data safety is improved.

Since the consistency group formed by the mirrored pairs is a single entity, it facilitates uniform management and operation of the mirrored pairs.

It should be noted that the primary and secondary storage devices involved in an embodiment of the present disclosure may be completely peer storage devices. In other words, the primary and secondary storage devices do not have the traditional "primary-secondary" relation, and the roles thereof are interchangeable. For example, the primary storage device may be a local storage device, and the secondary storage device may be a (for example, remote) backup storage device, and vice versa. Specifically, the number and size of the LUNs in the primary and secondary storage devices, as well as other configurations of the storage devices, may be exactly identical.

According to an embodiment of the present disclosure, re-creating the mirrored pairs based on one or more replication sessions between the logical units of the primary storage device and the logical units of the secondary storage device stored before interruption comprises: for the one or more replication sessions before the interruption, acquiring, from the database of the secondary storage device, the first information on the mirrored pairs before the interruption, to re-create the mirrored pairs.

Since the one or more replication sessions before the interruption have been stored in, the database of the secondary storage device, the first information for re-creating the mirrored pairs may be easily acquired from the database with less errors.

According to an embodiment of the present disclosure, for the one or more replication sessions before the interruption, acquiring, from the database of the secondary storage device, the first information on the mirrored pairs before the interruption, to re-create the mirrored pairs comprises: setting the secondary mirror of the secondary storage device as a new primary mirror; setting the primary mirror of the primary storage device as a new secondary mirror: and creating, based on the first information acquired from the database of the secondary storage device, a new mirrored pair including the new primary mirror and the new secondary mirror.

As a result, after recovering from the interruption state, the storage system still comprises the primary and secondary storage devices to allow the written data to be replicated from one storage device to the other storage device, thereby ensuring data safety.

According to an embodiment of the present disclosure, the method further comprises: removing an original mirrored pair of the primary storage device before setting the secondary mirror of the secondary storage device as the new primary mirror.

According to an embodiment of the present disclosure, replicating data to the primary storage device based on the re-created mirrored pair comprises: forming a new consistency group based on the re-created mirrored pair; in response to forming the new consistency group, storing second information including the re-created mirrored pair and the new consistency group to a database of the secondary storage device, and replicating the second information to a database of the primary storage device; and transmitting the replicated data from the secondary storage device to the primary storage device.

Due to the second information being stored in the database of the secondary storage device and replicated to the database of the primary storage device, if the interruption occurs again, infatuation about the mirrored pairs and the consistency group before the interruption can be automatically extracted from the second information in a similar manner. As a result, the mirrored pairs and the consistency group can be re-created, and the automatic recovery of the data replication can be achieved.

A second aspect of the present disclosure provides a device for recovering data replication between storage devices, comprising: a creating unit configured to create mirrored pairs between logical units of a primary storage device and logical units of a secondary storage device; a re-creating unit configured to, in response to the primary storage device recovering from an interruption state to a normal state, re-create the mirrored pairs based on one or more replication sessions between the logical units of the primary storage device and the logical units of the secondary storage device stored before interruption; and a data replicating unit configured to replicate data to the primary storage device based on the re-created mirrored pairs.

According to an embodiment of the present disclosure, the creating unit comprises: a mirrored pairs creating unit configured to create the mirrored pairs corresponding to the respective logical units of the primary storage device and the respective logical units of the secondary storage device, each mirrored pair including a primary mirror corresponding to one of the logical units of the primary storage device and a secondary mirror corresponding to a respective one of the logical units of the secondary storage device; a first consistency group forming unit configured to form a consistency group based on the mirrored pairs; and a first information replicating unit configured to store first information including the mirrored pairs and the consistency group to a database of the primary storage device, and replicate the first information to a database of the secondary storage device.

According to an embodiment of the present disclosure, the re-creating unit comprises: a mirrored pairs re-creating unit configured to, for the one or more replication sessions before the interruption, acquiring, from the database of the secondary storage device, the first information on the mirrored pairs before the interruption, to re-create the mirrored pairs.

According to an embodiment of the present disclosure, the mirrored pairs re-creating unit comprises: a first mirror setting subunit configured to set the primary mirror of the primary storage device as a new secondary mirror; a second mirror setting subunit configured to set the primary mirrors of the primary storage device as new secondary mirrors; and a mirrored pair creating subunit configured to create, based on the first information acquired from the database of the secondary storage device, a new mirrored pair including the new primary mirror and the new secondary mirror.

According to an embodiment of the present disclosure, the device further comprises: a mirrored pair removing unit configured to remove an original mirrored pair of the primary storage device before setting the secondary mirror of the secondary storage device as the new primary mirror.

According to an embodiment of the present disclosure, the data replicating unit comprises: a second consistency group forming unit configured to form a new consistency group based on the re-created mirrored pair; a second information replicating unit configured to, in response to forming the new consistency group, store second information including the re-created mirrored pair and the new consistency group to a database of the secondary storage device, and replicate the second information to a database of the primary storage device; and a data transmitting unit configured to transmit the replicated data from the secondary storage device to the primary storage device.

A third aspect of the present disclosure provides a computer program product for recovering data replication between storage devices, which is tangibly stored on a non-transient computer readable medium and comprises a computer executable instruction that, when being executed, enables the computer to execute steps of the method according to the first aspect of the present disclosure.

DETAILED DESCRIPTION OF EMBODIMENTS

Figure 1:
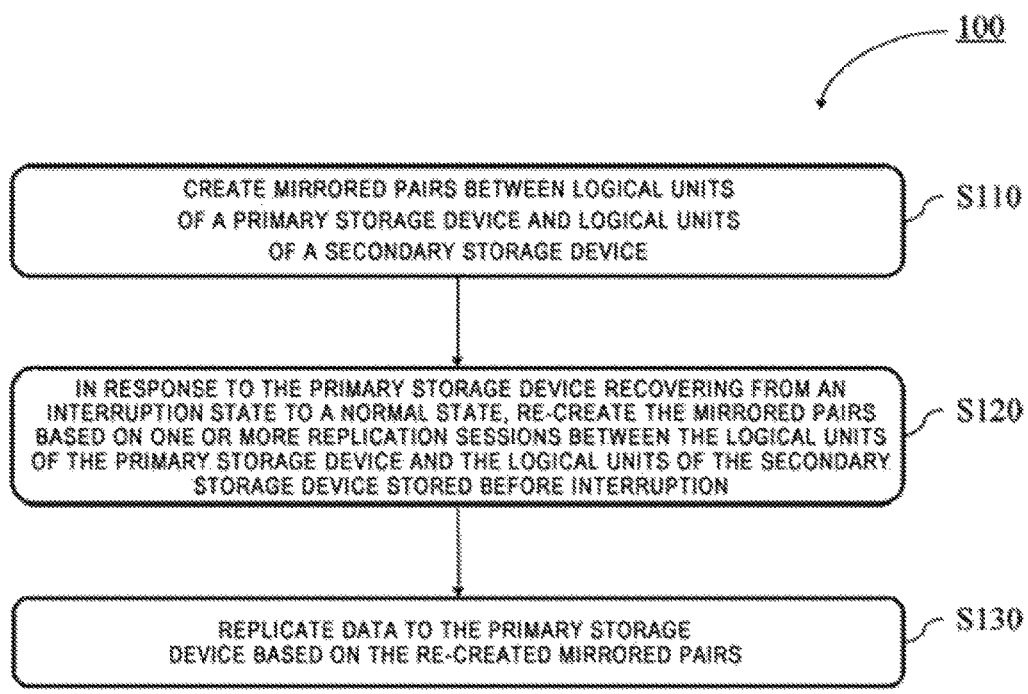
FIG. 1 illustrates a flow chart of a method of recovering data replication between storage devices according to an embodiment of the present disclosure.

Hereinafter, principles of the present disclosure will be described in detail with reference to several embodiments shown in the drawings. Though the drawings show several embodiments of the present disclosure, it should be appreciated that embodiments described herein are only provided to assist those skilled in the art to understand and implement the present disclosure, rather than limiting the scope of the present disclosure in any manner.

FIG. 1 illustrates a flow chart. 100 of a method of recovering data replication between storage devices according to an embodiment of the present disclosure. As shown in FIG. 1, the method 100 comprises the following steps S110-S130.

At S110, mirrored pairs between logical units of a primary storage device and logical units of a secondary storage device are created. At S120, in response to the primary storage device recovering from an interruption state to a normal state, the mirrored pairs are re-created based on one or more replication sessions between the logical units of the primary storage device and the logical units of the secondary storage device stored before interruption. Next, at S130, data is replicated to the primary storage device based, on the re-created mirrored pairs.

Figure 2A:
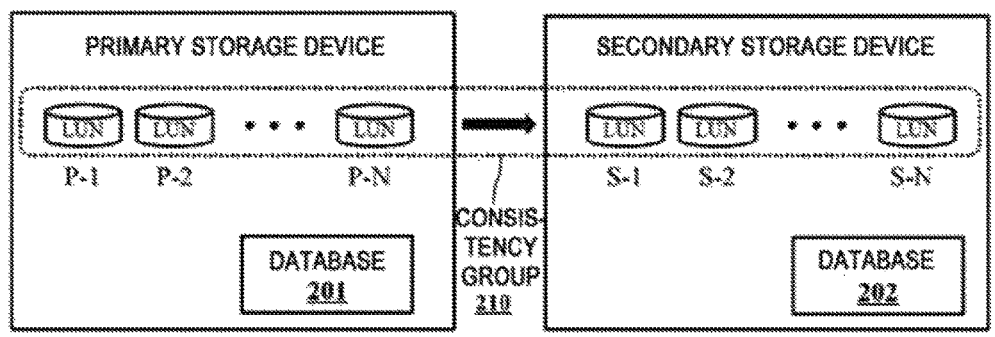
FIG. 2a illustrates a schematic diagram of a replication session before interruption according to an embodiment of the present disclosure.
Figure 2B:
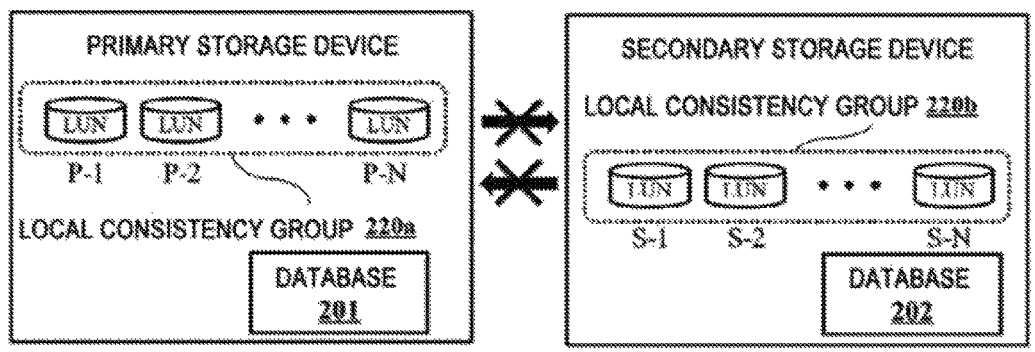
FIG. 2b illustrates a schematic diagram of a replication session after interruption but before recovery according to an embodiment of the present disclosure.
Figure 2C:
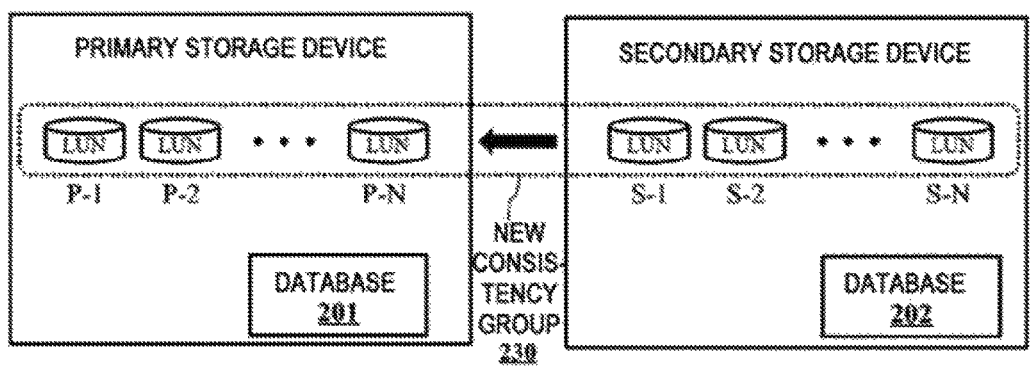
FIG. 2c illustrates a schematic diagram of a replication session after recovery from an interruption state according to an embodiment of the present disclosure.
Figure 3:
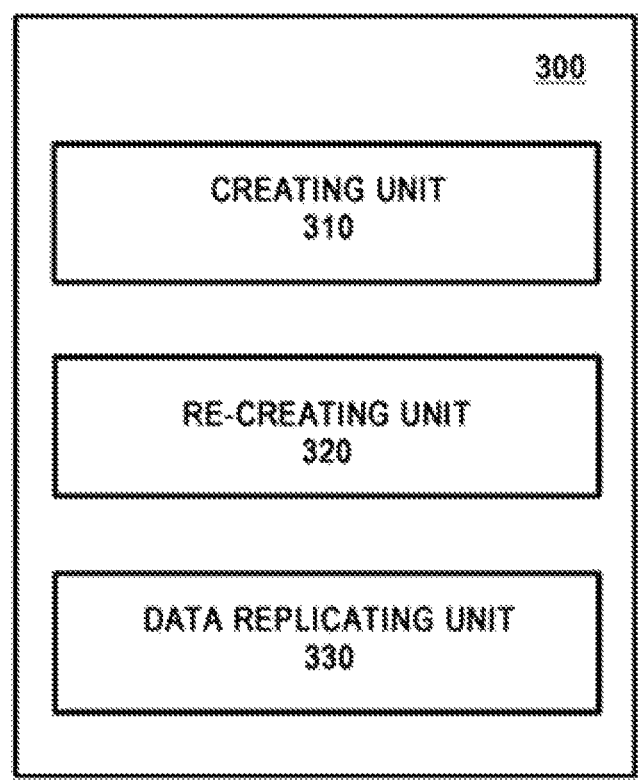
FIG. 3 illustrates a block diagram of a device for recovering data replication between storage devices according to an embodiment of the present disclosure.

FIG. 2 illustrates, respectively, schematic diagrams of replication sessions before interruption (FIG. 2a), after interruption but before recovery (FIG. 2b), and after recovery from the interruption state (FIG. 2c) according to an embodiment of the present disclosure.

Details of steps of method 100 as shown in FIG. 1 are discussed below with respect to FIGS. 2a, 2b and 2c.

According to an embodiment of the present disclosure, at S110, the mirrored pairs corresponding to the respective logical units of the primary storage device and the respective logical units of the secondary storage device are created. Each mirrored pair includes a primary mirror corresponding to one of the logical units of the primary storage device and a secondary mirror corresponding to a respective one of the logical units of the secondary storage device. A consistency group is formed based on the mirrored pairs. First information including the mirrored pairs and the consistency group is stored to a database of the primary storage device, and is replicated to a database of the secondary storage device.

An embodiment shown in FIG. 2a illustrates the primary and secondary storage devices, each of them including a plurality of LUNs. P-1, P-2, . . . , P-N are used herein to represent, respectively, primary mirrors of LUNs in the primary storage device. P represents the primary storage device side, and 1, 2, . . . , N each represents the index of the primary mirror of the LUN in the primary storage device. Similarly, S-1, S-2, . . . , S-N represent, respectively, secondary mirrors of corresponding LUNs in the secondary storage device. S represents the secondary storage device side, and 1, 2, . . . , N each represents the index of the secondary mirror of the LUN in the secondary storage device.

For a write operation, the data is firstly written into the LUNs at the primary storage device side and simultaneously replicated (or synchronized) to the LUNs at the secondary storage device side, to ensure that the data stored in the LUNs at the primary storage device side and in the LUNs at the secondary storage device side are exactly identical after the write operation. In this way, upon a failure of the primary storage device, the secondary storage device can immediately provide a data service as a backup storage device. Thus, data synchronization is achieved and data safety is ensured.

It should be noted that the data synchronization is implemented through the mirrored pairs comprising the primary mirrors and the secondary mirrors. For example, the data synchronization may be implemented through MinorView/S solution of the EMC. As shown in FIG. 2a, for example, (P-1, P-2) constitutes a completely corresponding mirror pair, and similarly, (P-2, S-2); (P-3, S-3); . . . ; (P-N, S-N) are completely corresponding mirror pairs. It should be noted that the term "completely corresponding" described herein indicates that the LUNs in the primary storage device correspond to those in the secondary storage device (in terms of the number and the size), and that the writing sequences for the LUNs in the primary storage device correspond to those for the LUNs in the secondary storage device. A consistency group 210 is illustrated in a dotted box, as shown in FIG. 2a. The box straddling across the primary storage device side and the secondary storage device side is used to indicate that the consistency group 210 is a single entity for facilitating uniform management and operation. As shown in FIG. 2a, when the primary and secondary storage devices are operating normally, data is replicated from the LUNs of the primary storage device to the LUNs of the secondary storage device, wherein the arrow indicates the direction of data replication. Besides, the first information (not shown) including the mirrored pairs and the consistency group 210 is also stored in the database 201 of the primary storage device and replicated, to the database 202 of the secondary storage device. Replication of the first information from the database 201 of the primary storage device to the database 202 of the secondary storage device may be performed in real time as well.

FIG. 2b illustrates a schematic diagram of replication sessions before interruption but before recovery. As shown in FIG. 2b, when the primary storage device is interrupted, the original consistency group 210 is destroyed, and therefore, two consistency groups (220a, 220b) in the local state are respectively formed in the primary and secondary storage devices. As the primary storage device is interrupted, the data is firstly written into the LUNs at the secondary storage device side and is attempted to be replicated (or synchronized) to the LUNs at the primary storage device side. At this time, the original secondary mirror in the secondary storage device substantively serves as the primary minor, but the original primary mirror in the primary storage device cannot form the corresponding secondary mirror because of the interruption of the primary storage device. As a result, the written data cannot be replicated from the LUNs of the secondary storage device to the LUNs of the primary storage device. In FIG. 2b, the cross on the arrow schematically represents that it is impossible to realite data replication in either the direction from the primary storage device to the secondary storage device or the direction from the secondary storage device to the primary storage device.

After the primary storage device is recovered from the interruption state, the method 100 proceeds to S120. At S120, in response to the primary storage device recovering from an interruption state to a normal state, the mirrored pairs is re-created based on one or more replication sessions between the logical units of the primary storage device and the logical units of the secondary storage device stored before interruption.

According to an embodiment of the present disclosure, at S120, for the one or more replication sessions before the interruption, the first information on the mirrored pairs before the interruption may be acquired from the database of the secondary storage device to re-create the mirrored pairs.

100451 As stated above, since the first information including the mirrored pairs and the consistency group has been stored in the database 201 of the primary storage device and (for example, in real time) replicated to the database 202 of the secondary storage device before the interruption of the primary storage device occurs, for the one or more replication sessions before the interruption, the first information on the mirrored pairs before the interruption is acquired from the database 202 of the secondary storage device to re-create the mirrored pairs.

It should be noted that as re-creating the mirrored pairs is based on the one or more replication sessions before the interruption, re-creating the relevant mirrored pairs may be selectively only based on one session or based on all the sessions, for example.

According to an embodiment of the present disclosure, for the one or more replication sessions before the interruption, acquiring, from the database of the secondary storage device, the first information on the mirrored pairs before the interruption, to re-create the mirrored pairs comprises the following steps of:

setting the secondary mirror of the secondary storage device as a new primary mirror;

setting the primary minor of the primary storage device as a new secondary mirror; and creating, based on the first information acquired from the database of the secondary storage device, a new mirrored pair including the new primary minor and the new secondary mirror.

FIG. 2c illustrates a schematic diagram of replication sessions after recovery from the interruption state. As shown in FIG. 2c, at this time, the original secondary mirrors S-1, S-2, . . . , S-N on the secondary storage device are set as the new primary mirrors, and the original primary mirrors P-1, P-2, . . . , P-N on the primary storage device are set as the new secondary mirrors. Based on the first information acquired from the database 202 of the secondary storage device, new mirrored pairs including the new primary mirrors and the new secondary mirrors are created, i.e., the mirrored pairs before interruption are re-created.

According to an embodiment of the present disclosure, the method 100 may further comprise an additional step of:

removing an original mirrored pair of the primary storage device before setting the secondary mirror of the secondary storage device as the new primary mirror.

According to the embodiment of FIG. 2c, before setting the secondary mirror of the secondary storage device as the new primary mirror, the original mirrored pair included in the consistency group 220a still reserved on the primary storage device is firstly removed, together with the consistency group 220a in the local state.

Next, after re-creating the new mirrored pairs, the method 100 proceeds to S130. At S130, the data is replicated to the primary storage device based on the re-created mirrored pairs.

According to an embodiment of the present disclosure, at S130, a new consistency group is formed based on the re-created mirrored pairs. In response to forming the new consistency group, second information including the re-created mirrored pair and the new consistency group is stored to a database of the secondary storage device, and replicated to a database of the primary storage device. The replicated data is transmitted from the secondary storage device to the primary storage device.

According to the embodiment of FIG. 2c, after re-creating the mirrored pairs (P-1, S-1); (P-2, S-2); . . . ; (P-N, S-N) before interruption, a new consistency group 230 is formed based on the re-created mirrored pairs. As shown in FIG. 2c, the found/re-created mirrored pairs constitute a new single consistency group 230 straddling across the primary storage device side and secondary storage device side, thereby enabling data replication. Subsequently, second information (not shown) including the re-created mirrored pairs and the new consistency group 230 is stored in the database 202 of the secondary storage device and replicated to the database 201 of the primary storage device. At this time, the original primary storage device actually serves as the new secondary storage device, and the original secondary storage device actually serves as the new primary storage device. Therefore, the data replication direction is changed accordingly, i.e., the data is replicated from the LUNs of the secondary storage device to the LUNs of the primary storage device, as indicated by the arrow in FIG. 2c. Then, the file transmission from the secondary storage device to the primary storage device is started.

Moreover, it should be noted that as the method is indempotent, the replication data will not be lost in case of that any of the above steps fails or terminates. A user may retry the recovery of the interrupted data replication later.

A second aspect of the present disclosure provides a device 300 for recovering data replication between storage devices, comprising: a creating unit 310 configured to create mirrored pairs between logical units of a primary storage device and logical units of a secondary storage device; a re-creating unit 320 configured to, in response to the primary storage device recovering from an interruption state to a normal state, re-create the mirrored pairs based on one or more replication sessions between the logical units of the primary storage device and the logical units of the secondary storage device stored before interruption; and a data replicating unit 330 configured to replicate data to the primary storage device based on the re-created mirrored pairs.

According to an embodiment of the present disclosure, the creating unit 310 comprises: a mirrored pairs creating unit configured to create the mirrored pairs corresponding to the respective logical units of the primary storage device and the respective logical units of the secondary storage device, each mirrored pair including a primary mirror corresponding to one of the logical units of the primary storage device and a secondary mirror corresponding to a respective one of the logical units of the secondary storage device; a first consistency group forming unit configured to form a consistency group based on the mirrored pairs; and a first information replicating unit configured to store first information including the mirrored pairs and the consistency group to a database of the primary storage device, and replicate the first information to a database of the secondary storage device.

According to an embodiment of the present disclosure, the re-creating unit 320 comprises: a mirrored pairs re-creating unit configured to, for the one or more replication sessions before the interruption, acquiring, from the database of the secondary storage device, the first information on the mirrored pairs before the interruption, to re-create the mirrored pairs.

According to an embodiment of the present disclosure, the mirrored pairs re-creating unit comprises: a first mirror setting subunit configured to set the primary mirror of the primary storage device as a new secondary mirror; a second mirror setting subunit configured to set the primary mirrors of the primary storage device as new secondary mirrors; and a mirrored pair creating subunit configured to create, based on the first information acquired from the database of the secondary storage device, a new mirrored pair including the new primary mirror and the new secondary mirror.

According to an embodiment of the present disclosure, the device 300 further comprises: a mirrored pair removing unit configured to remove an original mirrored pair of the primary storage device before setting the secondary mirror of the secondary storage device as the new primary mirror.

According to an embodiment of the present disclosure, the data replicating unit 330 comprises: a second consistency group forming unit configured to form a new consistency group based on the re-created mirrored pair; a second information replicating unit configured to, in response to forming the new consistency group, store second information including the re-created mirrored pair and the new consistency group to a database of the secondary storage device, and replicate the second information to a database of the primary storage device: and a data transmitting unit configured to transmit the replicated data from the secondary storage device to the primary storage device, transmitting the data from the secondary storage device to the primary storage device.

To conclude, various embodiments of the present disclosure provide a method and device for recovering data replication between storage devices. The method comprises: creating mirrored pairs between logical units of a primary storage device and logical units of a secondary storage device; in response to the primary storage device recovering from an interruption state to a normal state, re-creating the mirrored pairs based on one or more replication sessions between the logical units of the primary storage device and the logical units of the secondary storage device stored before interruption; and replicating data to the primary storage device based on the re-created mirrored pairs. The method allows to recover interrupted data replication in an automatic manner after recovering the primary storage device from the interruption state. Once a recovering command is performed, the data may be replicated to the primary storage device. Besides, the method results in convenient re-creating of the consistency group and the mirrored pairs with fewer errors. Meanwhile, the method is indempotent, and therefore, the replication data will not be lost in the case that any of the above steps fails or terminates. The user may retry the recovery of the interrupted data replication later.

The foregoing is only optional embodiments of the present disclosure but does not intend to limit the present disclosure, and for those skilled in the art, the present disclosure may have various modifications and changes. All the amendments, equivalent replacements, improvements, etc. made within the spirit and principle of the present disclosure should be covered in the protection scope of the present disclosure.

What is claimed is:

1. A method of recovering data replication between storage devices, comprising:
   creating mirrored pairs between logical units of a primary storage device and logical units of a secondary storage device;
   in response to the primary storage device recovering from an interruption state to a normal state, re-creating the mirrored pairs based on one or more replication sessions between the logical units of the primary storage device and the logical units of the secondary storage device stored before interruption; and
   replicating data to the primary storage device based on the re-created mirrored pairs.

2. The method according to claim 1, wherein creating mirrored pairs between logical units of a primary storage device and logical units of a secondary storage device comprises:
   creating the mirrored pairs corresponding to the respective logical units of the primary storage device and the respective logical units of the secondary storage device, each mirrored pair including a primary mirror corresponding to one of the logical units of the primary storage device and a secondary mirror corresponding to a respective one of the logical units of the secondary storage device;
   forming a consistency group based on the mirrored pairs; and
   storing first information including the mirrored pairs and the consistency group to a database of the primary storage device, and replicating the first information to a database of the secondary storage device.

3. The method according to claim 2, wherein re-creating the mirrored pairs based on one or more replication sessions between the logical units of the primary storage device and the logical units of the secondary storage device stored before interruption comprises:
   for the one or more replication sessions before the interruption, acquiring, from the database of the secondary storage device, the first information on the mirrored pairs before the interruption, to re-create the mirrored pairs.

4. The method according to claim 3, wherein for the one or more replication sessions before the interruption, acquiring, from the database of the secondary storage device, the first information on the mirrored pairs before the interruption, to re-create the mirrored pairs comprises:
   setting the secondary mirror of the secondary storage device as a new primary mirror;
   setting the primary mirror of the primary storage device as a new secondary mirror; and
   creating, based on the first information acquired from the database of the secondary storage device, a new mirrored pair including the new primary mirror and the new secondary mirror.

5. The method according to claim 3, further comprising:
   removing an original mirrored pair of the primary storage device before setting the secondary mirror of the secondary storage device as the new primary mirror.

6. The method according to claim 1, wherein replicating data to the primary storage device based on the re-created mirrored pair comprises:
   forming a new consistency group based on the re-created mirrored pair;
   in response to forming the new consistency group, storing second information including the re-created mirrored pair and the new consistency group to a database of the secondary storage device, and replicating the second information to a database of the primary storage device; and
   transmitting the replicated data from the secondary storage device to the primary storage device.

7. A device for recovering data replication between storage devices, comprising:

a creating unit configured to create mirrored pairs between logical units of a primary storage device and logical units of a secondary storage device;

a re-creating unit configured to, in response to the primary storage device recovering from an interruption state to a normal state, re-create the mirrored pairs based on one or more replication sessions between the logical units of the primary storage device and the logical units of the secondary storage device stored before interruption; and a data replicating unit configured to replicate data to the primary storage device'based on the re-created mirrored pairs.

8. The device according to claim 7, wherein the creating unit comprises:

a mirrored pairs creating unit configured to create the mirrored pairs corresponding to the respective logical units of the primary storage device and the respective logical units of the secondary storage device, each mirrored pair including a primary mirror corresponding to one of the logical units of the primary storage device and a secondary mirror corresponding to a respective one of the logical units of the secondary storage device;

a first consistency group forming unit configured to form a consistency group based on the mirrored pairs; and a first information replicating unit configured to store first information including the mirrored pairs and the consistency group to a database of the primary storage device, and replicate the first information to a database of the secondary storage device.

9. The device according to claim 8, wherein the re-creating unit comprises:

a mirrored pairs re-creating unit configured to, for the one or more replication sessions before the interruption, acquiring, from the database of the secondary storage device, the first information on the mirrored pairs before the interruption, to re-create the mirrored pairs.

10. The device according to claim 9, wherein the mirrored pairs re-creating unit comprises:

a first mirror setting subunit configured to set the primary mirror of the primary storage device as a new secondary mirror a second mirror setting subunit configured to set the primary mirrors of the primary storage device as new secondary mirrors; and a mirrored pair creating subunit configured to create, based on the first information acquired from the database of the secondary storage device, a new mirrored pair including the new primary mirror and the new secondary mirror.

11. The device according to claim 9, further comprising:

a mirrored pair removing unit configured to remove an original mirrored pair of the primary storage device before setting the secondary mirror of the secondary storage device as the new primary mirror.

12. The device according to claim 7, wherein the data replicating unit comprises:

a second consistency group forming unit configured to form a new consistency group based on the re-created mirrored pair;

a second information replicating unit configured to, in response to forming the new consistency group, store second information including the re-created mirrored pair and the new consistency group to a database of the secondary storage device, and replicate the second information to a database of the primary storage device; and a data transmitting unit configured to transmit the replicated data from the secondary storage device to the primary storage device.

13. A computer program product for recovering data replication between storage devices, the computer program product comprising:

a non-transitory computer readable medium encoded with computer-executable code, the code configured to enable the execution of:

creating mirrored pairs between logical units of a primary storage device and logical units of a secondary storage device;

in response to the primary storage device recovering from an interruption state to a normal state, re-creating the mirrored pairs based on one or more replication sessions between the logical units of the primary storage device and the logical units of the secondary storage device stored before interruption; and replicating data to the primary storage device based on the re-created mirrored pairs.

14. The computer program product according to claim 13, wherein creating mirrored pairs between logical units of a primary storage device and logical units of a secondary storage device comprises:

creating the mirrored pairs corresponding to the respective logical units of the primary storage device and the respective logical units of the secondary storage device, each mirrored pair including a primary mirror corresponding to one of the logical units of the primary storage device and, a secondary mirror corresponding to a respective one of the logical units of the secondary storage device;

forming a consistency group based on the mirrored pairs; and storing first information including the mirrored pairs and the consistency group to a database of the primary storage device, and replicating the first information to a database of the secondary storage device.

15. The computer program product according to claim 14, wherein re-creating the mirrored pairs based on one or more replication sessions between the logical units of the primary storage device and the logical units of the secondary storage device stored before interruption comprises:

for the one or more replication sessions before the interruption, acquiring, from the database of the secondary storage device, the first information on the mirrored pairs before the interruption, to re-create the mirrored pairs.

16. The computer program product according to claim 15, wherein for the one or more replication sessions before the interruption, acquiring, from the database of the secondary storage device, the first information on the mirrored pairs before the interruption, to re-create the mirrored pairs comprises:

setting the secondary mirror of the secondary storage device as a new primary mirror;

setting the primary mirror of the primary storage device as a new secondary mirror; and creating, based on the first information acquired from the database of the secondary storage device, a new mirrored pair including the new primary mirror and the new secondary mirror.

17. The computer program product according to claim 15, wherein the code is further configured to enable the execution of:

removing an original mirrored pair of the primary storage device before setting the secondary mirror of the secondary storage device as the new primary mirror.

18. The computer program product according to claim 13, wherein replicating data to the primary storage device based on the re-created mirrored pair comprises:
  forming a new consistency group based on the re-created mirrored pair;
  in response to forming the new consistency group, storing second information including the re-created mirrored pair and the new consistency group to a database of the secondary storage device, and replicating the second information to a database of the primary storage device; and
  transmitting the replicated data from the secondary storage device to the primary storage device.

* * * * *